April 16, 1957  K. G. KIRCHNER  2,788,730
OFFSET DISK HARROW

Filed Nov. 4, 1953  2 Sheets-Sheet 1

INVENTOR
KENNETH G. KIRCHNER
ATTORNEY

INVENTOR
KENNETH G. KIRCHNER
ATTORNEY

2,788,730
OFFSET DISK HARROW

Kenneth G. Kirchner, Stockton, Calif., assignor to International Harvester Company, a corporation of New Jersey Application November 4, 1953, Serial No. 390,170

3 Claims. (Cl. 97—47.54)

This invention relates to agricultural implements and particularly to an implement of the offset disk harrow type adapted to be mounted integrally with a tractor to be carried thereby in transport. More specifically the invention concerns an implement adapted particularly for mounting upon a tractor equipped with a hitch mechanism of the two-point type.

Versatility in an implement such as an offset disk harrow, which is useful in cultivating orchards and the like, is an important feature since the implement is often operated on either side of the tractor upon which it is mounted.

An object of the present invention is the provision of an improved tractor implement of the offset disk harrow type wherein two longitudinally spaced gangs of disks are operated at an angle to each other and wherein means are provided for adjusting the relative positions of the disks.

Another object of the invention is the provision in an integral tractor disk harrow of novel means for adjusting the position of the earth-working tools relative to the tractor.

Another object of the invention is the provision in a tractor offset disk harrow, wherein means are provided for operating the harrow on either side of a longitudinal center line through the tractor, of means for laterally adjusting the tool gangs relative to the tractor, and for adjusting the longitudinal spacing between the earth-working tools and the tractor wheels to avoid contact therewith.

Another object of the invention is the provision of improved means for laterally adjusting the gangs of an offset harrow with respect to the tractor upon which it is mounted, and means for securing the earth-working tools in a selected laterally adjusted position.

Other objects and advantages of the invention will become clear from the following detailed description when read in conjunction with the accompanying drawings, wherein:

Fig. 3 is a section taken on the line 3—3 of Fig. 1.

Figure 1:
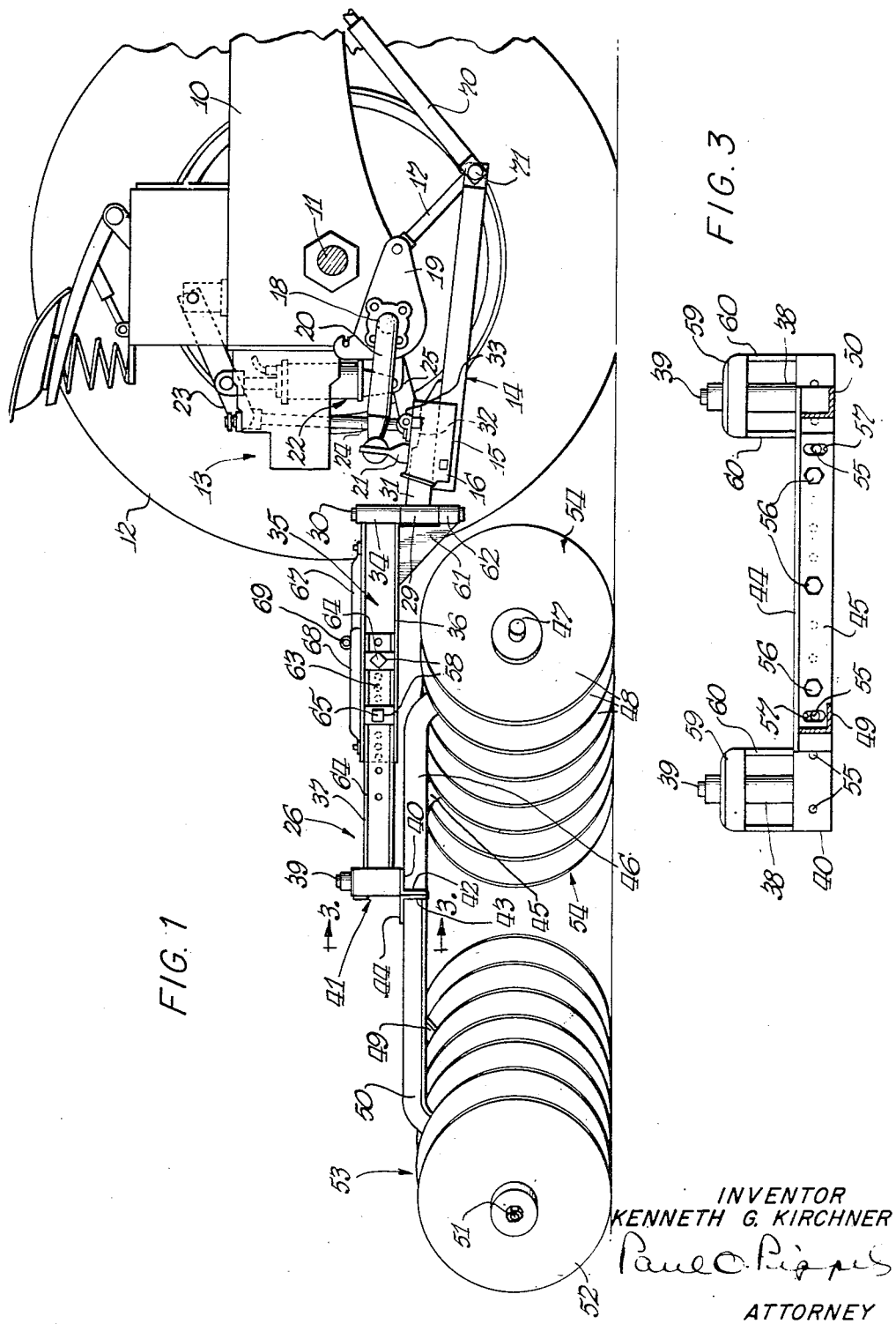
Fig. 1 is a view in side elevation of the rear end of a tractor having a tractor-attaching mechanism or hitch structure, and having mounted thereon an implement embodying the features of this invention.

Referring to the drawings, it will be observed that the numeral 10 designates the longitudinally extending body of a tractor having a transverse rear axle 11 carrying laterally spaced drive wheels 12, only one of which is shown.

Mounted upon and forming a part of the tractor is an implement attaching structure generally designated by the numeral 13 and comprising a yoke shaped drawbar 14 having rearwardly extending laterally spaced arms 15 to the ends of which are secured socket members 16. The details of construction of the tractor hitch structure 13 are more fully described in a copending application, Serial No. 338,651, filed February 25, 1953. It will be briefly noted, however, that the drawbar 14 is pivotally connected to a draft member 17 connected to the tractor body in advance of the rear axle thereof.

For raising and lowering of the drawbar 14 and, therefore, of the socket members 16, in order to properly position the hitch mechanism vertically to facilitate attachment of an implement thereto, a transverse rockshaft 18 is provided and mounted in two or more brackets 19 affixed to the tractor body. Lift arms 20 at the ends of the rockshaft 18 are connected by links 21 with the ends of the drawbar arms 15. Rocking of the shaft 18 to raise and lower the drawbar is effected by a hydraulic ram 22 anchored at its lower end to the tractor and connected at its upper end to a lift link 23 which, in turn, is connected by a rod 24 with an arm 25 affixed to the rockshaft 18. Fluid under pressure is supplied to the ram 22 in any suitable manner to raise and lower the link 23 about its pivot on the tractor and therefore also raise and lower the arm 25 to the rockshaft 18.

The implement with which the present invention is concerned is an offset disk harrow generally designated by 26 and includes a hitch frame 27. Hitch frame 27 comprises a rigid transverse bar 28 provided at its ends with vertical spindle portions 29 carrying, respectively, spindles 30. The vertical portions 29 are rigid with the ends of the bar 28 and have affixed thereto, as by welding, and extending forwardly therefrom, laterally spaced parallel shaft members 31 adapted for sliding reception in the respective sockets 16, and provided with notches 32 cooperating with latch mechanism 33 carried by the elongated sockets to rigidly hold the shafts in said sockets and render the hitch frame 27 unitary with the tractor attaching structure 13. It will be observed that the sockets 16 are elongated and receive therein a major portion of the shafts 31 to provide a stable connection between the tractor and implement whereby the implement may be raised and lowered between operating and transport positions relative to the tractor, and may be transported thereby.

Vertical spindles 30 are pivotally received in bearings 34 integral with the forward ends, respectively, of a pair of laterally spaced, parallel beams or supporting links 35 which are horizontally disposed and extend longitudinally rearwardly from the hitch frame 27 for lateral swinging movement about the axes of the spindles 30.

Each of the beams 35 consists of a channel shaped sleeve portion 36 and a channel shaped shaft portion 37 receivable between the flanges of the sleeve portion 36. The rear ends of each of the shaft parts 37 have attached thereto a vertical bearing 38 in which is pivotally received a pivot pin 39. The pivot pins 39 are affixed to and project upwardly from opposite ends of a transverse angle bar 40 forming a part of the tool carrying supporting frame, generally designated at 41.

The angle bar 40 has a vertical flange 42 which abuts the vertical flange 43 of another angle bar 44. Angle bar 40 has affixed thereto and extending forwardly therefrom, laterally spaced frame elements 45 and 46 to which are suitably secured a diagonally extending tool shaft 47 rotatably supporting, at spaced locations thereon, earth penetrating disks 48.

Similarly affixed to the angle bar 44 are frame members 49 and 50 which extend rearwardly from the angle bar and support at their ends a diagonally extending shaft 51 carrying at spaced locations thereon earth penetrating disks 52, the latter gang of disks being generally designated by the numeral 53 and being disposed at an angle with respect to the forward gang of disks, generally designated by the numeral 54.

The angle bars 40 and 44 are adjustably secured together by the provision of a plurality of openings 55 in the angle bar 40 and registering openings in the angle bar 44 in which are received bolts 56. It should thus be clear that by removing the bolts 56, the angle bar 44, and therefore the entire rear gang 53 may be adjusted laterally relative to the front gang 54, which is necessary to accommodate varying ground conditions. It may also be noted that adjustment of the rear gang 53 relative to the front gang 54 about a longitudinal horizontal axis may be made by retaining the central bolt 56 as a pivot, moving the flanking bolts in slots 57 provided in the angle bar 44 and registering with openings 55 in the angle bar 40. This levels the gangs with respect to each other.

As pointed out before the part 37 of the beam 35 is slidable in the part 36. The part 37 is held against displacement and guided in the channel member 36 by the provision of a pair of retainers 58 carried by each of the channels 36. The bearing member 38 at the end of the slidable channel 37 is retained by the provision of a U-shaped cap 59, rotatably receiving spindle 39, and provided with legs 60 affixed as by welding to the angle bar 40. It should also be noted that the channel member 36 is further braced on the pivot pin or spindle 30 by the provision of a triangular bracing member 61 affixed to the forward end of the member 36 and having a bearing portion 62 rotatably carrying the lower end of the spindle 30.

The telescoping of the parts 37 with respect to the parts 36 of the beams 35 accommodates longitudinal adjustment of the tool gangs 53 and 54 relative to the hitch frame 27, and the tractor. This adjustment is accomplished by the provision of a plurality of openings 63 in the part 36 registerable with a plurality of openings 64 in the part 37. Bolts 65 are passed through the retainers 58 for reception in registering openings in the telescoping parts when the parts have been adjusted to selected positions.

Figure 2:
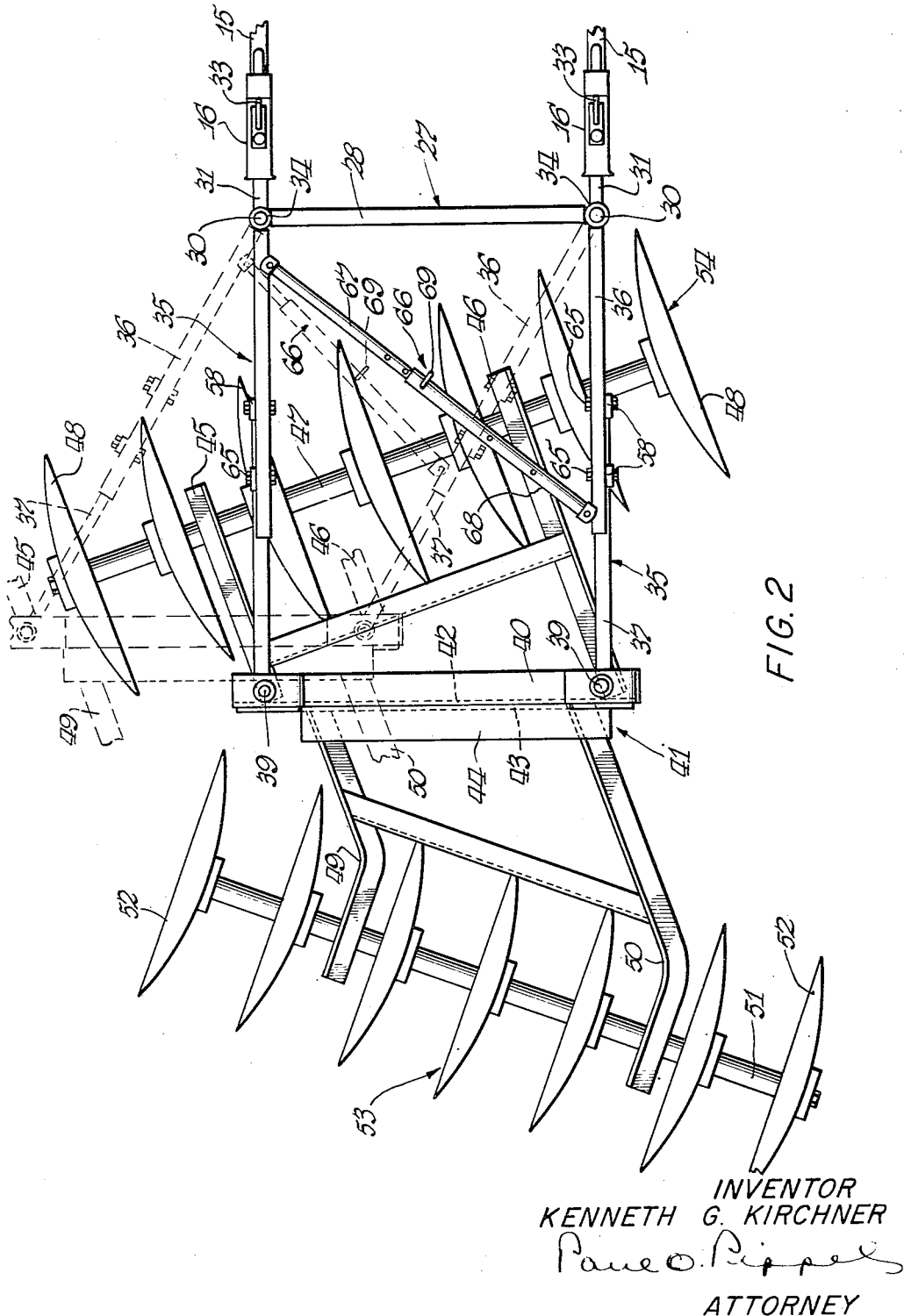
Fig. 2 is a plan view of the tractor offset disk harrow of this invention, and showing a portion of the sockets of the tractor two-point attaching mechanism.

This adjustment becomes necessary when the parallel beams or links 35 are swung laterally about the pivots 30 to positions such as indicated in dotted lines in Fig. 2 where the entire tool-carrying frame has been moved laterally with respect to the tractor. The implement is retained in its laterally adjusted position by the provision of a diagonal brace 66 which comprises a shaft part 67 slidable in and telescoping with respect to a sleeve 68, the former being pivotally attached to the left hand channel member 36 near its forward end and the sleeve 68 being pivotally attached to the right hand channel member 36 near its rear end. A plurality of suitable registering openings are provided in the sleeve 68 and the shaft 67 for the reception of a pin 69 for holding the telescoping parts in a selected position. In the movement of the implement from the solid line position of Fig. 2, to the dotted line position thereof, it will be noted that the telescoping brace 66 is adjusted to the dotted line position thereof.

Release of the implement from the tractor is accomplished simply by releasing the latch 33 and driving the tractor away from the implement. Reattachment is just as simply made by backing the tractor to the implement, with the socket 16 raised or lowered to the proper height for reception of shafts 31, the latches 33 carried by the sockets 16 being automatically effective to lock the shafts therein. The implement may then be immediately placed in operation or raised to a position for transport by the tractor.

It is believed that the operation of the implement of this invention will be clearly understood from the foregoing description. It should likewise be understood, however, that modifications may be made in the invention without departing from the spirit thereof or the scope of the appended claims.

What is claimed is:

1. An implement adapted for integral connection to a tractor having an attaching structure, comprising a hitch frame including laterally spaced attaching elements for connection to the tractor attaching structure, a first pair of laterally spaced generally parallel horizontally disposed links pivotally connected to said hitch frame on vertical axes for lateral swinging relative thereto and extending rearwardly therefrom, a second pair of laterally spaced links telescopically associated with said first links, a tool-supporting frame pivotally mounted on said second links on vertical axes to accommodate lateral swinging thereof, means for rigidly securing said second links in selected adjusted positions with respect to said first links to regulate the longitudinal spacing between the tool-supporting frame and the tractor upon swinging said first links laterally, said tool-supporting frame including forward and rearward tool-carrying sections, connecting means between said sections accommodating relative adjustment thereof about a longitudinal axis, said connecting means including means for holding said sections in a selected adjusted position.

2. An implement adapted for integral connection to a tractor having an attaching structure, comprising a hitch frame including laterally spaced attaching elements for connection to the tractor attaching structure, a first pair of laterally spaced generally parallel horizontally disposed links pivotally connected to said hitch frame on vertical axes for lateral swinging relative thereto and extending rearwardly therefrom, a second pair of laterally spaced links telescopically associated with the respective of said first links, a tool-supporting frame pivotally mounted on said second links on vertical axes to accommodate lateral swinging thereof, means for rigidly securing said second links in selected adjusted positions with respect to said first links to regulate the longitudinal spacing between the tool-supporting frame and the tractor upon swinging said first links laterally, and an adjustable brace extending diagonally between said first links for holding the latter against lateral swinging, said tool-supporting frame including forward and rearward tool-carrying sections, centrally disposed pivot means connecting said sections to accommodate relative adjustment therebetween about a longitudinal axis, one of said sections having vertically extending slots therein and the other said section having bolt means receivable in said slots for holding said sections in selected adjusted positions.

3. The invention set forth in claim 2, wherein said connecting means includes means accommodating bodily adjustment of one of said sections laterally relative to the other.

References Cited in the file of this patent

UNITED STATES PATENTS

| 696,808 | Gatling | Apr. 1, 1902 |
| 2,386,378 | Wippel | Oct. 9, 1945 |
| 2,463,169 | Grewe | Mar. 1, 1949 |
| 2,575,622 | Fraga | Nov. 20, 1951 |
| 2,616,349 | Lindeman et al. | Nov. 4, 1952 |
| 2,660,938 | Kaupke | Dec. 1, 1953 |
| 2,692,148 | Bywater | Oct. 19, 1954 |

FOREIGN PATENTS

| 184,894 | Great Britain | Aug. 24, 1922 |
| 402,764 | Great Britain | Dec. 4, 1933 |
| 568,051 | France | Dec. 15, 1923 |
| 880,672 | Germany | June 22, 1953 |